United States Patent
Tan et al.

(10) Patent No.: US 7,756,486 B1
(45) Date of Patent: Jul. 13, 2010

(54) TRANSMITTER AND RECEIVER IMPEDANCE CONTROL USING SHUNT SWITCHES

(75) Inventors: Chun-Geik Tan, Singapore (SG); Randy Tsang, Foster City, CA (US); Wayne A. Loeb, San Francisco, CA (US)

(73) Assignee: Marvell International Ltd. (BM)

( * ) Notice: Subject to any disclaimer, the term of this patent is extended or adjusted under 35 U.S.C. 154(b) by 909 days.

(21) Appl. No.: 11/544,163

(22) Filed: Oct. 5, 2006

Related U.S. Application Data

(60) Provisional application No. 60/737,265, filed on Nov. 16, 2005.

(51) Int. Cl.
*H04B 1/38* (2006.01)
(52) U.S. Cl. .......................... 455/73; 455/78; 455/118; 455/182.1; 455/323; 455/83; 323/222; 323/267; 323/271; 330/51; 330/151; 327/408; 327/427
(58) Field of Classification Search .................. 455/73, 455/78, 118, 323, 182.1, 83; 323/222, 267, 323/271, 51, 151; 327/408, 427
See application file for complete search history.

(56) References Cited

U.S. PATENT DOCUMENTS

| | | | | |
|---|---|---|---|---|
| 6,040,732 | A * | 3/2000 | Brokaw | 327/408 |
| 6,066,943 | A * | 5/2000 | Hastings et al. | 323/285 |
| 6,069,526 | A * | 5/2000 | Ballantyne | 330/51 |
| 7,031,668 | B2 * | 4/2006 | Darabi et al. | 455/75 |
| 7,233,772 | B1 * | 6/2007 | Darabi et al. | 455/20 |
| 7,292,827 | B2 * | 11/2007 | McCorkle | 455/78 |
| 7,548,726 | B1 * | 6/2009 | Rofougaran | 455/20 |
| 7,558,556 | B1 * | 7/2009 | Moloudi et al. | 455/323 |
| 2005/0095990 | A1 * | 5/2005 | Yip | 455/73 |
| 2005/0107043 | A1 * | 5/2005 | Avasarala et al. | 455/78 |

* cited by examiner

*Primary Examiner*—Marceau Milord

(57) ABSTRACT

Circuits, methods, and apparatus that provide isolation between receive and transmit circuits in a wireless transceiver. One example provides switches that can be included on an integrated circuit with at least portions of a wireless transceiver. These switches vary the impedance of transmitter and receiver circuits between a termination impedance and a high impedance by inserting or removing components in parallel with matching networks. Signal losses are minimized since these switches are shunt connected to input and output paths on the wireless circuit and are not connected directly in either signal path.

40 Claims, 15 Drawing Sheets

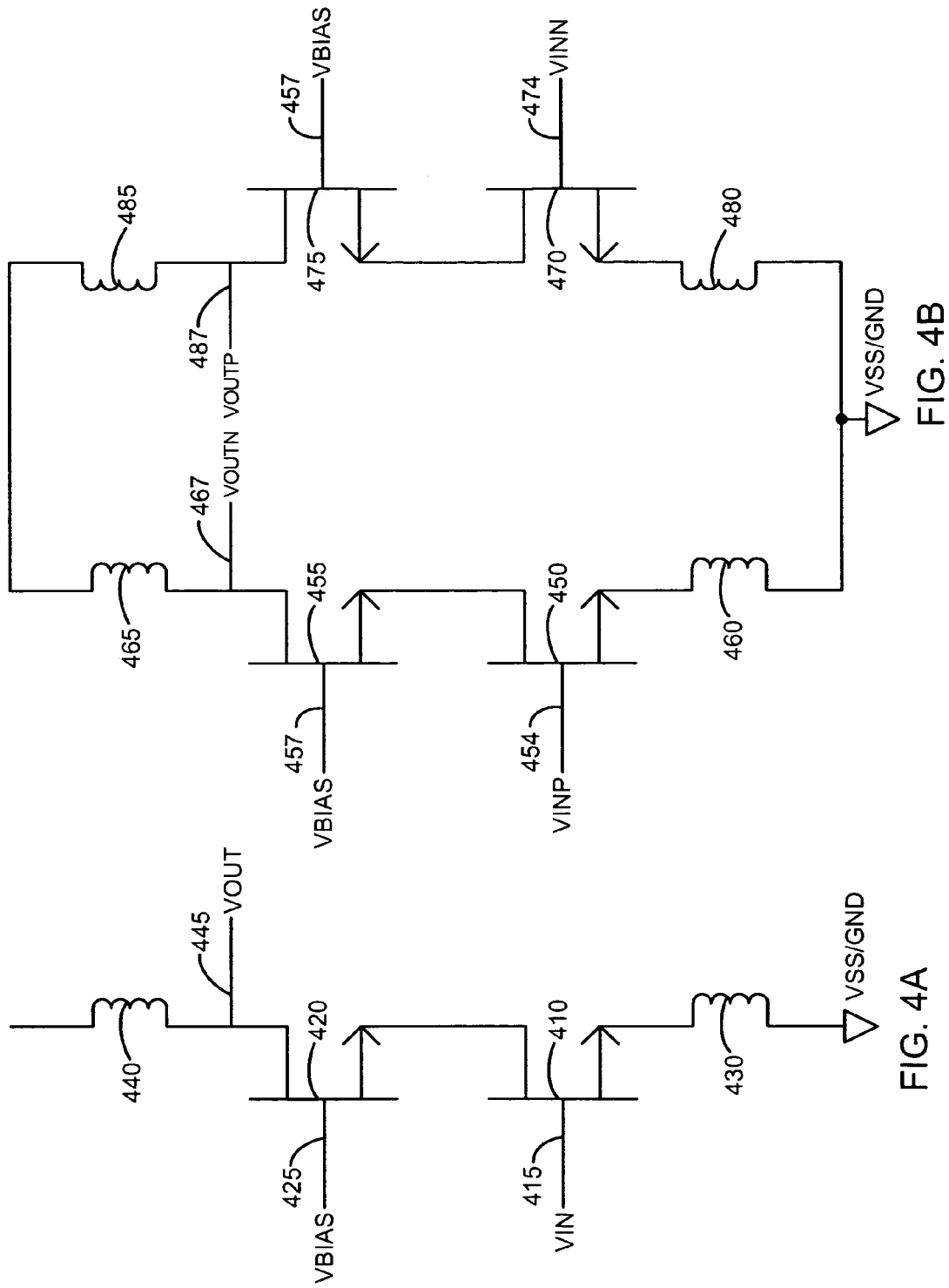

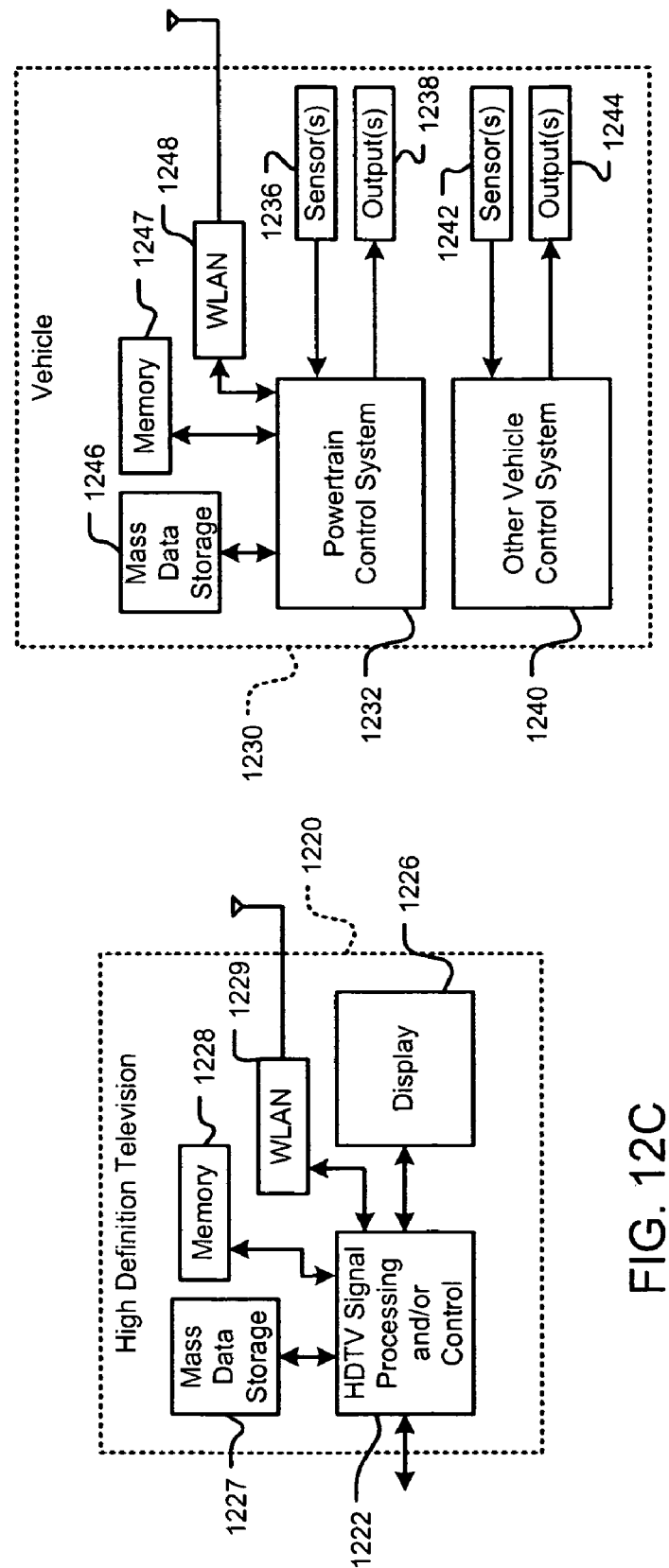

TRANSMITTER AND RECEIVER IMPEDANCE CONTROL USING SHUNT SWITCHES

CROSS-REFERENCES TO RELATED APPLICATIONS

This application claims the benefit of U.S. provisional patent application No. 60/737,265, filed Nov. 16, 2005, entitled "LNA/PA Simultaneous Matching Scheme With Shunt TX/RX Switch" which is incorporated by reference.

BACKGROUND

The present invention relates generally to varying impedances to improve the isolation between transmit and receive circuits in wireless transceivers, and more particularly to controlling the impedances using shunt switches.

Wireless circuits are rapidly becoming ubiquitous, appearing in a number of electronic applications such as desktop and laptop computers, handheld devices, camcorders, inventory control devices, and myriad other devices. At the same time, pricing pressures have increased as these circuits are seen less as a feature and more as a requirement. Accordingly, it is desirable to reduce costs, for example by reducing the number of components necessary to implement a wireless solution. One such component that may be removed is a transmit and receive switch.

Wireless circuits send data using a transmitter and receive data using a receiver. When a wireless circuit is transmitting, the receiver is still present. Unfortunately, any loading the receiver places on the transmitter reduces the transmitted power, thereby reducing transmitter range. Similarly, when the wireless circuit is receiving, the transmitter remains in place and any received power absorbed by the transmitter reduces the effective input received signal strength.

To provide the necessary isolation between receiver and transmitter, conventional wireless circuits make use of a transmit and receive switch to disconnect the transmitter when data is received and the receiver when data is transmitted.

Accordingly, conventional circuits insert a switch in series into either or both the receive and transmit paths. These switches isolate the receiver when transmitting and isolate the transmitter when receiving. Unfortunately, these switches are not ideal; that is, they include series resistances, capacitances, and inductances, and other parasitic components. Because of this, the switches reduce system performance. For example, some of the transmitted power is absorbed by the switch, reducing the power transmitted over the antenna. Similarly, when a signal is received, some of the received signal strength is lost in the switch.

To reduce these losses, the switches are typically off-chip devices designed for this purpose, which adds to the cost of the circuit.

SUMMARY

Accordingly, embodiments of the present invention provide circuits, methods, and apparatus that provide isolation between receive and transmit circuits in a wireless transceiver. An exemplary embodiment of the present invention provides switches that can be included on an integrated circuit with at least portions of a wireless transceiver. These switches vary the impedance of transmitter and receiver circuits between a termination impedance and a high impedance by inserting or removing components in parallel (in shunt) with matching networks. Thus, signal losses are minimized since these switches are shunt connected to input and output paths on the wireless circuit and are not connected directly in either signal path. Other embodiments of the present invention provide switches that vary the impedance of these circuits among two or more termination impedance values, or among two or more termination impedance values and a high impedance.

One embodiment of the present invention provides a transmitter including a power amplifier connected to an antenna through a matching network. The frequency response of the matching network is controlled by switching one or more components in and out of the network. This results in the impedance (at the carrier frequency) that is seen by the antenna being varied between a termination impedance and an impedance that is significantly higher than the termination impedance. In a specific embodiment of the present invention, the termination impedance is 50 ohms, though in other embodiments it may be other values, for example 100 or 200 ohms.

This embodiment also provides a low-noise amplifier that is connected to an antenna through another matching network. Again, the frequency response of this second matching network is controlled by switching one or more components in and out of the matching network. This results in the impedance (at the carrier frequency) that is seen by the antenna being varied between a termination impedance and an impedance that is significantly higher than the termination impedance.

One embodiment of the present invention employs a switch in a shunt configuration to connect (or insert) or disconnect a capacitor in parallel with a matching network to vary circuit impedance. This switch is in parallel, that is, it is in a shunt configuration, rather than in series with the signal path such that signal power losses are reduced. The matching network can be configured such that when the switch is closed, the circuit appears as a high impedance. Alternately, the matching network can be configured such that when the switch is open, the circuit appears as a high impedance.

This embodiment provides a power amplifier having a differential output. A switch in series with a capacitor to an AC ground is connected to each output. The switches can be closed such that the antenna sees a high impedance in the transmit path during signal reception. These switches can be opened such that the antenna sees a termination impedance in the transmit path during transmission. Other components of the power amplifier can be turned off or disabled to reduce power consumption during reception.

This embodiment further provides a low-noise amplifier having a single-ended input. A switch in series with a capacitor is connected across the gate-to-source capacitor of an input transistor. The switch can be opened such that the antenna sees a high impedance in the receive path during transmission. This switch can be closed such that the antenna sees a termination impedance in the receive path during reception. Other components of the low-noise amplifier can be turned off or disable to reduce power consumption during transmission. Various embodiments of the present invention may incorporate one or more of these or the other features described herein.

One embodiment of the present invention provides means for isolating a transmitting circuit and a receiving circuit in a wireless transceiver. This embodiment of the present invention provides means for changing an input impedance of the receiving circuit from a high impedance to a termination impedance and means for changing an output impedance of the transmitting circuit from a termination impedance to a high impedance before receiving data. This embodiment also provides means for changing the input impedance of the receiving circuit from the termination impedance to the high impedance and means for changing the output impedance of the transmitting circuit from the high impedance to the termination impedance before transmitting data.

In this an embodiment of the present invention, the means for changing the input impedance of the transmitting circuit include a first switch and the means for changing the input impedance of the receiving circuit include a second switch, where the first and second switches are in series with a first and second component, and are N-channel MOS transistors on an integrated circuit, the integrated circuit further comprising the transmitting circuit and the receiving circuit. In this and other embodiments of the present invention, the first component and the second component are capacitors. In this and other embodiments of the present invention when the first switch is closed, the first component is inserted in parallel with the gate-to-source capacitance of an input transistor of a low-noise amplifier. In this and other embodiments of the present invention, a drain of the input transistor of the low-noise amplifier is coupled to a source of a cascode transistor and a source of the input transistor is coupled to an inductor. In this and other embodiments of the present invention, when the second switch is closed, the second component is inserted between a drain of an output transistor of a power amplifier and a first supply terminal. In this and other embodiments of the present invention, the output transistor is a cascode transistor having a source coupled to a drain of an input transistor of the power amplifier. In this and other embodiments of the present invention, the first supply terminal is ground. In this and other embodiments of the present invention, when the first switch is closed, the first component is in parallel with a first matching network. In this and other embodiments of the present invention, when the second switch is closed, the second component is in parallel with a second matching network.

Another embodiment of the present invention provides means for receiving and transmitting data using a wireless transceiver. This embodiment provides means for closing a first switch, the first switch in series with a first capacitor, such that the first capacitor is inserted in parallel with a gate-to-source capacitance of an input gain transistor of a low-noise amplifier when receiving data; and means for closing a second switch and a third switch, the second switch in series with a second capacitor and the third switch in series with a third capacitor, such that the second capacitor is inserted between a drain of a first output transistor of a power amplifier and a first supply terminal and the third capacitor is inserted between a drain of a second output transistor of the power amplifier and the first supply terminal when receiving data. This embodiment further provides means for opening the first switch such that the first capacitor is not in parallel with the gate-to-source capacitance of the input gain transistor of the low-noise amplifier when transmitting data; and means for opening the second switch and the third switch such that the second capacitor is not between a drain of a first output transistor of a power amplifier and a first supply terminal and the third capacitor not between a drain of a second output transistor of the power amplifier and the first supply terminal when transmitting data.

In this and other embodiments of the present invention, the first, second, and third switches are N-channel MOS transistors on an integrated circuit, the integrated circuit further comprising the low-noise amplifier and power amplifier. In this and other embodiments of the present invention, the first, second, and third capacitors are metal-insulator-metal capacitors. In this and other embodiments of the present invention, a drain of the input gain transistor of the low-noise amplifier is coupled to a source of a cascode transistor and a source of the input transistor is coupled to an inductor. In this and other embodiments of the present invention, the first output transistor is a first cascode transistor having a source coupled to a drain of a first input transistor of the power amplifier, and the second output transistor is a second cascode transistor having a source coupled to a drain of a second input transistor of the power amplifier. In this and other embodiments of the present invention, the first supply terminal is ground. In this and other embodiments of the present invention, when the first switch is closed, the first capacitor is in parallel with a first matching network. In this and other embodiments of the present invention, when the second and third switches are closed, the second component is in parallel with a first portion of a second matching network and the third component is in parallel with a second portion of a second matching network.

In other embodiments, different types of switches could be used. For example, the switches could be MOS devices or bipolar. The switches could be J-FET, MOSFET, MESFET, MODFET or IGBT. The switches could be a BJT (bipolar junction transistor) or a DHBT (double heterojunction bipolar transistor). The switches can be integrated into a CMOS, bipolar, or BiCMOS integrated circuit. Alternately, the switches could be mechanical, such as CMOS MEMS devices. Alternately, any other type of switch could be used.

A better understanding of the nature and advantages of the present invention may be gained with reference to the following detailed description and the accompanying drawings.

BRIEF DESCRIPTION OF THE DRAWINGS

FIG. 4A is a schematic of a single-ended low-noise amplifier that may be used in wireless transceivers consistent with an embodiment of the present invention, while FIG. 4B is a schematic of a differential low-noise amplifier that may be used in wireless transceivers consistent with an embodiment of the present invention;

FIGS. 12A-12H illustrate various implementations of exemplary embodiments of the present invention.

DESCRIPTION OF EXEMPLARY EMBODIMENTS

Figure 1:
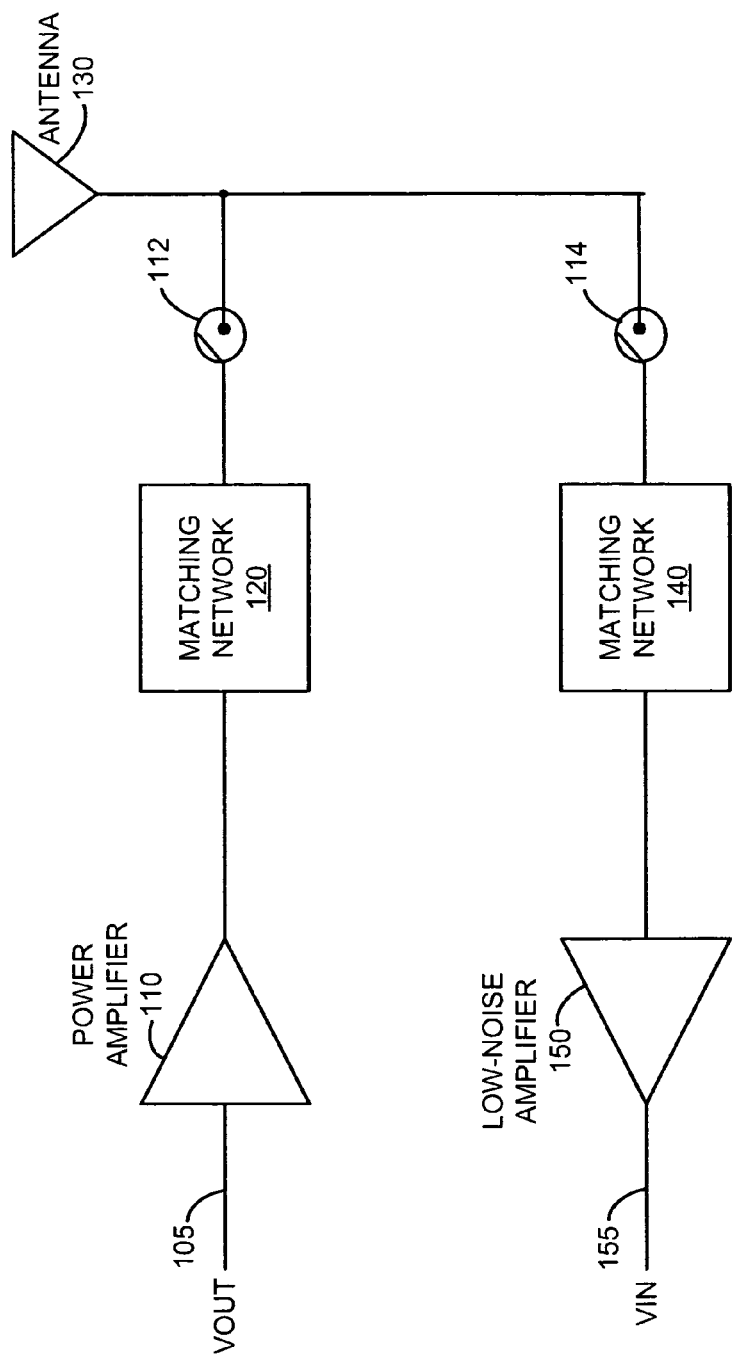
FIG. 1 illustrates a portion of a prior art wireless transceiver.

FIG. 1 illustrates a portion of a prior art wireless transceiver. This figure includes transmit circuitry including power amplifier 110 and a matching network 120, receive circuitry including matching network 140 and low-noise amplifier 150, and antenna 130. This figure, as with the other included figures, is shown for illustrative purposes and does not limit either the possible embodiments of the present invention or the claims.

The power amplifier 110 and low-noise amplifier 150 may each be single-ended or differential circuits depending on the specific embodiment of the present invention. These circuits are typically included on an integrated circuit along with other receive and transmit circuits, as well as interface circuitry for communication with other circuits. The matching networks 120 and 140 may be on chip or off chip, or portions of either or both circuits may be on or off chip. Similarly, the antenna 130 may be on or off chip.

Data is transmitted by providing an output signal VOUT at node 105 to the power amplifier 110. The power amplifier 110 drives the antenna 130 via the matching network 120. The power amplifier provides gain to increase signal strength for transmission. The matching network provides a termination impedance for the power amplifier 110 for optimal power transfer. The value of the termination impedance can be determined based on the efficiency and linearity requirements of the power amplifier.

Data is received from the antenna 130 by low-noise amplifier 150 via matching network 140. The low-noise amplifier 150 amplifies the signal received at the antenna 130 and provides an output VIN at node 155. Again, the matching network 140 provides a termination impedance such that received power is transferred with reduced losses to the low-noise amplifier.

When transmitting, it is desirable that the low-noise amplifier 150 and matching network 140 do not provide a significant load for the power amplifier 110. For example, if no action is taken and the termination impedance of the low-noise amplifier 150 and matching network 140 remain as is, one-half of the transmitted power is absorbed by the receive circuit and thereby wasted. Similarly, when receiving, it is desirable that the power amplifier 110 and matching network 120 do not load the antenna 130. Again, if nothing is done and the termination impedance of the transmit circuit is left in place, one-half of the energy received at the antenna 130 is wasted in the transmit circuitry.

It is therefore desirable when transmitting, that the matching network 120 provide a termination impedance and that the matching network 140 provide a high impedance. Also, when receiving, it is desirable that the matching network 140 provide a termination impedance and that the matching network 120 provide a high impedance.

Accordingly, conventional circuits insert a switch into either or both the receive and transmit paths. These switches isolate the receiver when transmitting and isolate the transmitter when receiving. As shown in FIG. 1, a switch 112 in the transmit path is opened when the circuit is receiving, and closed when the circuit is transmitting. Similarly, a switch 114 in the receive path is closed when the circuit is receiving and opened when the circuit is transmitting.

Unfortunately, these switches are not ideal; that is, they include series resistances, capacitances, and inductances, and other parasitic components. Because of this, the switches reduce system performance. For example, when a power amplifier 110 needs to drive through a switch, some of the transmitted power is absorbed by the switch, reducing the power transmitted over the antenna 130. Similarly, when a signal received from the antenna 130 is required to go through a switch before reaching the low-noise amplifier 150, some of the received signal strength is lost in the switch.

To reduce these losses, the switches are typically off-chip devices designed for this purpose. However, this leads to another drawback. That is, they are not free. These switches currently add approximately $0.20 to the bill of materials for these wireless circuits.

Accordingly, embodiments of the present invention provide circuits, methods, and apparatus for varying the on-chip impedances of the received and transmit circuits without inserting switches into the receive and transmit signal pads, and without requiring a relatively expensive off-chip device. In short, this is done by varying the impedance provided by matching networks 120 and 140, where the impedance is varied depending on whether the device is transmitting or receiving signals. A simplified example is shown in the following figure.

Figure 2:
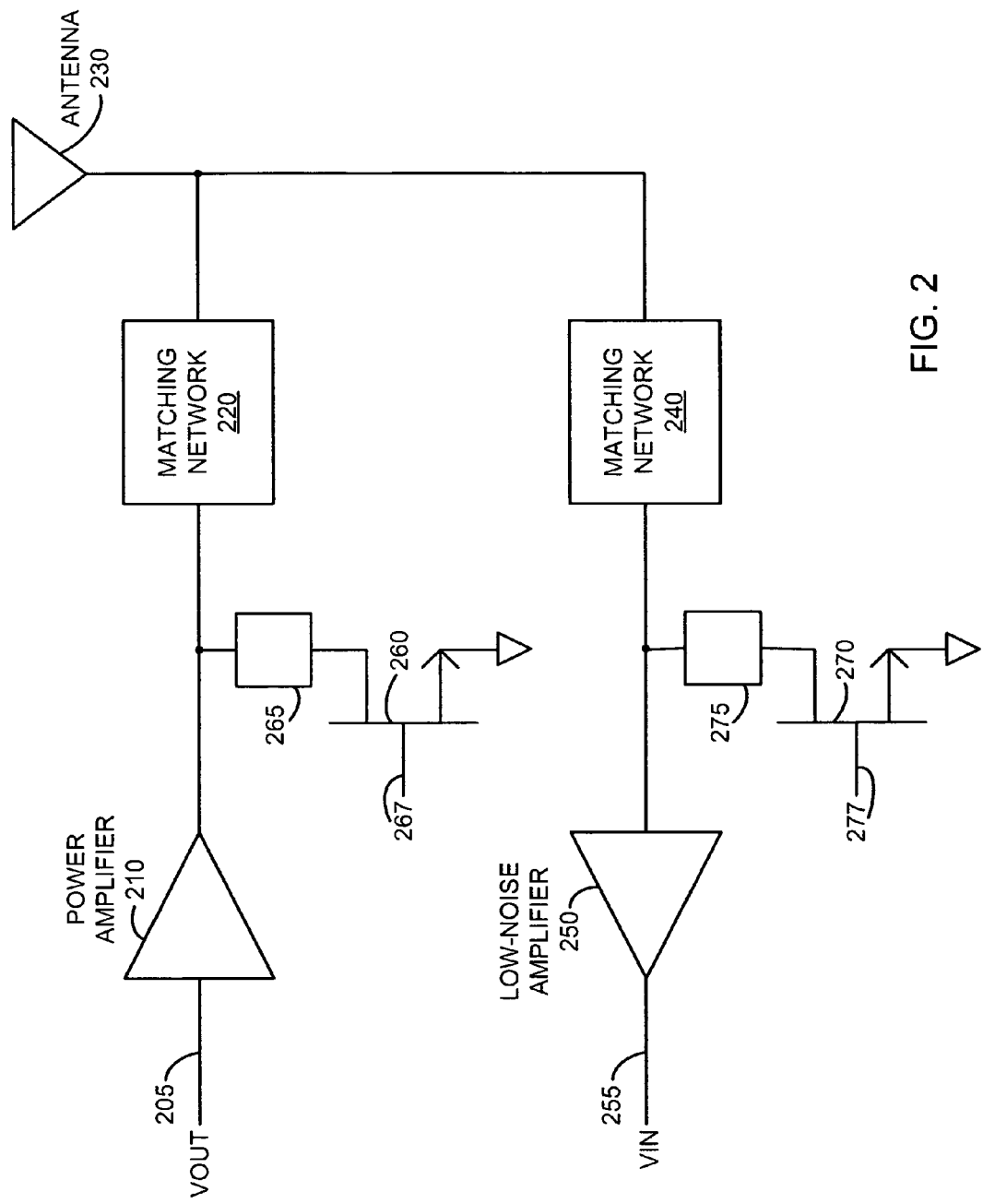
FIG. 2 is a block diagram of a portion of a wireless transceiver consistent with an embodiment of the present invention.

FIG. 2 is a block diagram of a portion of a wireless transceiver consistent with an embodiment of the present invention. This figure includes a transmit circuit including power amplifier 210, matching network 220, switch transistor 260, and component 265, a receive circuit including matching network 240, low-noise amplifier 250, switch transistor 270, component 275, and low-noise amplifier 250, and amplifier 230.

Again, data is transmitted by providing a signal VOUT on node 205 to the power amplifier 210. The power amplifier 210 amplifies the signal and drives the antenna 230 via the matching network 220. Similarly, signals are received on antenna 230 and provided to the low-noise amplifier 250 via the matching network 240. The low-noise amplifier 250 provides an output VIN on node 255.

Again, when transmitting, it is desirable that the matching network 220 provide a termination impedance and that the matching network 240 provide a high impedance, and when receiving, it is desirable for the matching network 240 to provide a termination impedance and for the matching network 220 to provide a high impedance. In this way, when transmitting, the receive path is isolated from the antenna 230, and when receiving, the transmit path is isolated from the antenna 230.

The transmitted and received signals are typically data signals that are modulated, or multiplied, by a periodic signal that oscillates at a radio frequency referred to as a carrier frequency. The matching networks 220 and 240 provide impedances that vary as a function of frequency. The frequency range of interest is centered around the carrier frequency, specifically, the carrier frequency plus and minus the data rate of the modulated data. It is at this frequency that it is desirable that the matching networks provide either a termination or a high impedance.

Accordingly, this embodiment switches component 265 in and out of the matching network 220 in order to change the impedance of the matching network 220 between a termination and a high impedance. Similarly, component 275 is switched in and out of the matching network 240 in order to vary the termination of the matching network 240 between a termination impedance and a high impedance. In other embodiments of the present invention, either or both of the switches 260 and 270 may be connected directly to a node in the matching networks 220 and 240. These switches and components, while acting on the signal path, are not directly in the signal paths themselves, and therefore have a reduced effect on the transmitted and received signal strengths. The switches and components are connected in a shunt configuration to the input and output paths of the wireless circuit.

This embodiment of the present invention varies circuit impedances by opening and closing switches 260 and 270 under control of control nodes VC1 on node 267 and VC2 on node 277. Closing the switches inserts the components 265 and 275 in the matching networks 220 and 240, and opening the switches 260 and 270 removes the components 265 and 275 from the matching networks 220 and 240.

In various embodiments of the present invention, inserting a component into a matching network results in the impedance of the matching network providing a termination impedance. In other embodiments of the present invention, inserting a component into a matching network results in the impedance of the matching network providing a high impedance. Furthermore, the transmit and receive circuits may or may not operate in the same manner. For example, inserting a component 265 into the matching network 220 may cause the matching network 220 to form a high impedance, while inserting component 275 in the receive matching network 240 may result in that network providing a termination impedance.

Also, in various embodiments of the present invention, other components may be switched in and out of the matching networks, for example, a capacitor or an inductor may be switched in and out of the matching networks 220 and 240. Similarly, different components may be switched in and out of matching networks in the transmit path than are switched in and out of matching networks in the receive path. Various embodiments may switch a number of different components in and out of the matching networks using one or more transistor switches. Also, in various embodiments of the present invention, one or more components are inserted, while simultaneously one or more are removed or disconnected.

In one embodiment, the switches are N-channel MOS transistors. In other embodiments of the present invention, other types of transistors or other devices may be used. For example, P-channel MOS transistors may be used as switches. Alternately, other types of transistors, such as bipolar or group III-V transistors may be used, and more complicated circuits, such as pass gates may be used. These switches may connect or disconnect a terminal of a component to and from ground, VCC, a reference voltage, or other appropriate node.

In the specific embodiments of the present invention shown in these figures, the impedances of the matching networks are varied between a termination and a high impedance. In other embodiments of the present invention, the impedances may be switched among multiple termination values and a high impedance, or between other levels of impedance.

Figure 3:
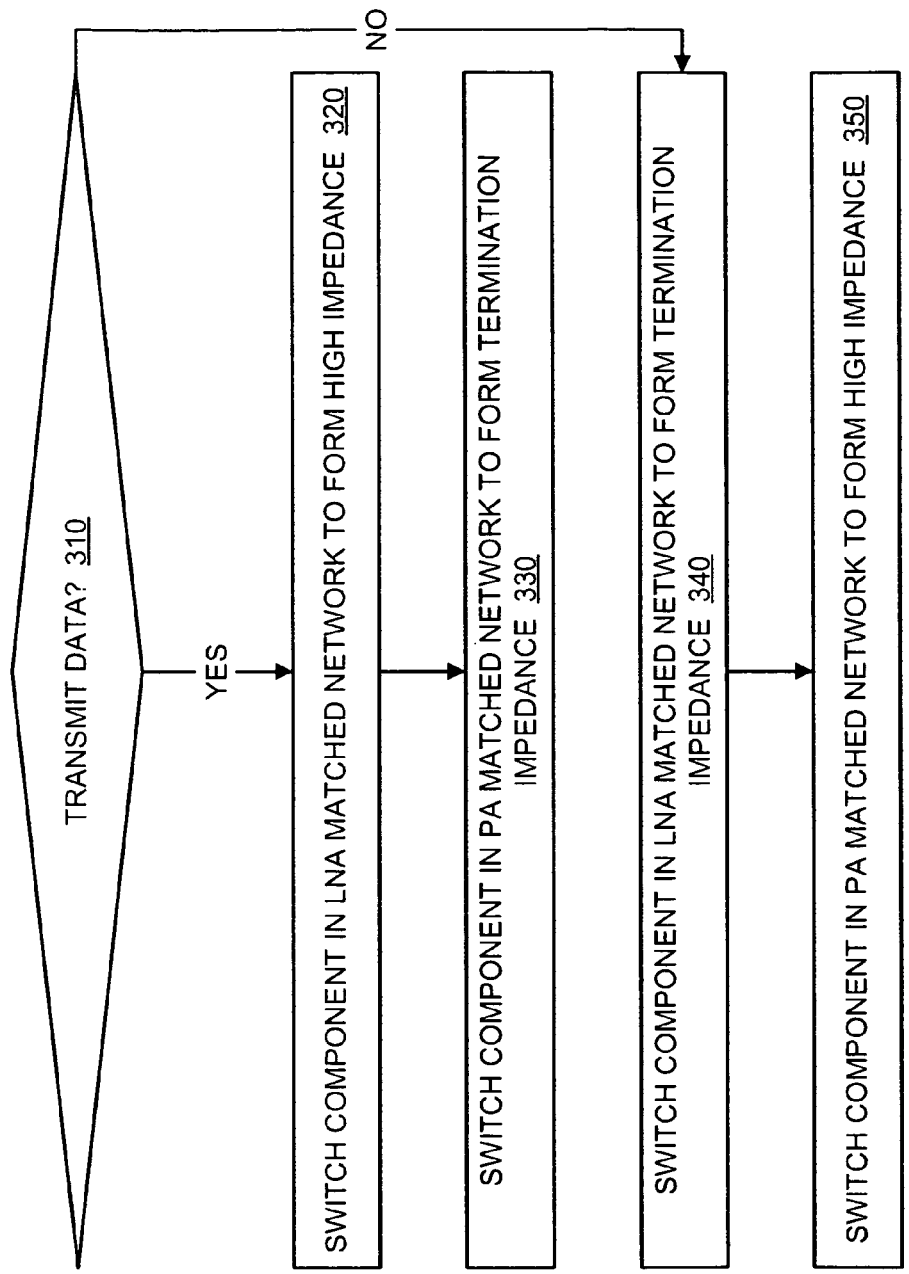
FIG. 3 is a flowchart illustrating a method of controlling impedances in a wireless transceiver according to an embodiment of the present invention.

FIG. 3 is a flowchart illustrating a method of controlling impedances in a wireless transceiver according to an embodiment of the present invention. Typically, when not transmitting data, a wireless transceiver attempts to receive data. The receipt of valid data can be detected by using a received strength indicator (RSSI) circuit, for example. Accordingly, this embodiment in the present invention determines whether data is being transmitted. If data is being transmitted, then the transmit and receive circuit impedances are configured for transmitting data. If data is not being transmitted, then the transmit and receive circuit impedances are configured for receiving data.

Specifically, in act 310, it is determined whether data is being transmitted. If it is, then a component in a low-noise amplifier matching network is switched to form a high impedance in the receive path in act 320. In act 330, a component is switched in the power amplifier matching network to form a termination impedance.

If data is not being transmitted, then in act 340 a component is switched in the low-noise amplifier matching network to form in termination impedance. Also, a component is switched in the power amplifier matching network to form a high impedance in act 350.

The low-noise amplifier and power amplifier circuits used in various embodiments of the present invention tend to be simple in nature due to the requirement that they operate at high frequency. Examples of a low-noise amplifier are shown in the following two figures, while the subsequent two figures illustrate exemplary power amplifiers.

FIG. 4A is a schematic of a single-ended low-noise amplifier (amplifier 250 of FIG. 2) that may be used in wireless transceivers consistent with an embodiment of the present invention. This circuit includes input transistor 410, cascode transistor 420, source inductor 430, and load inductor 440.

A signal VIN is received on node 415 by the input transistor 410. Transistor 410 amplifies the signal and changes the current through inductor 440 to generate an output signal VOUT on node 445. The cascode transistor 420 reduces the voltage gain at the drain of transistor 410, thereby isolating the signal VIN received on node 415 from the Miller capacitance of transistor 410. Either or both of the inductors 430 and 440 may be formed using a bond wire, or they may be on-chip or off chip inductors.

FIG. 4B is a schematic of a differential low-noise amplifier (amplifier 250 of FIG. 2) that may be used in wireless transceivers consistent with an embodiment of the present invention. The operation of this circuit is analogous to the single-ended circuit shown in FIG. 4A. In this example, a differential signal VINP-VINN is received on nodes 454 and 474, and a differential output signal VOUTP-VOUTN is provided on nodes 487 and 467.

Figures 5A, 5B:
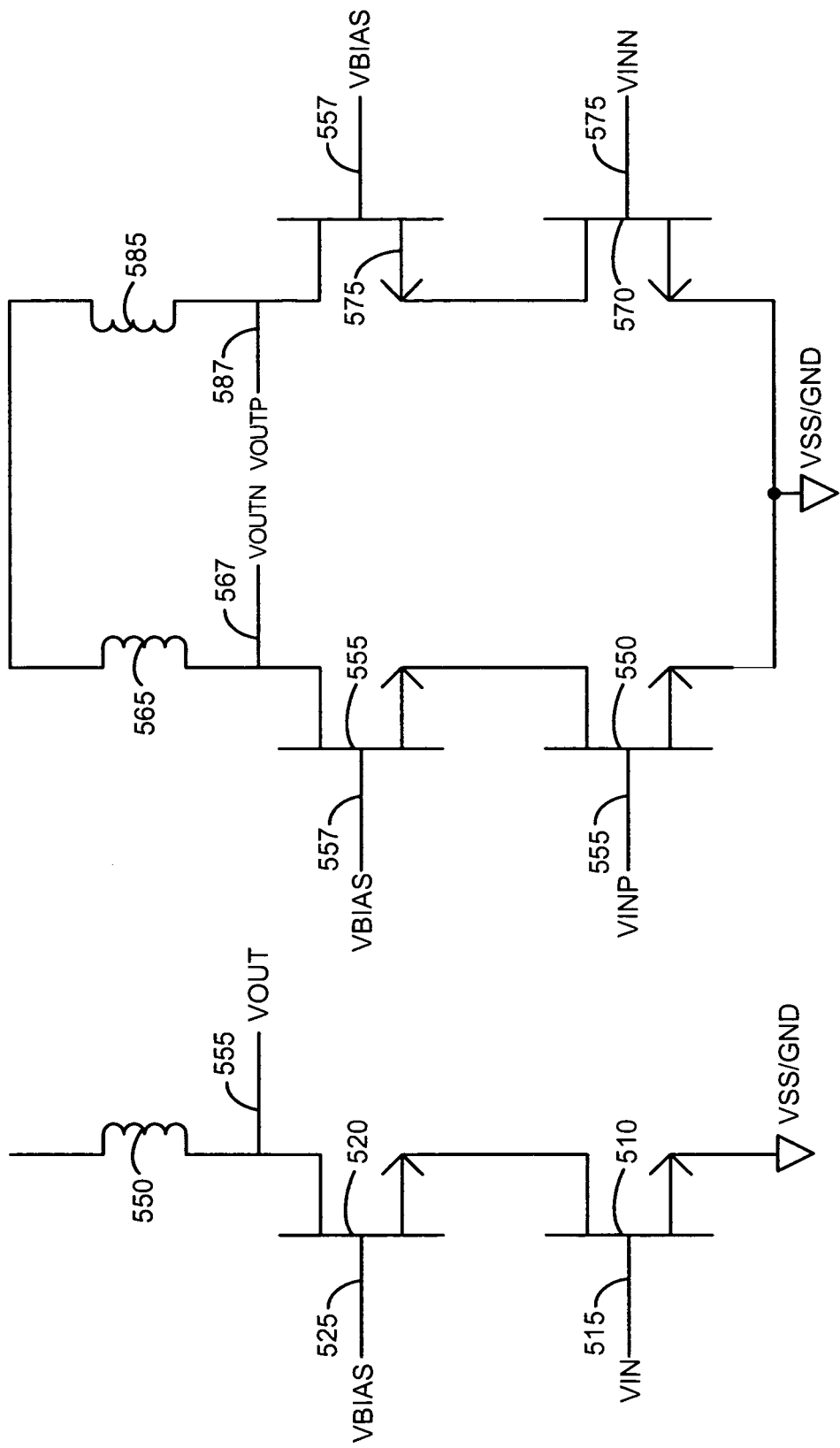
FIG. 5A is a schematic of a single-ended power amplifier that may be used in wireless transceivers consistent with an embodiment of the present invention, while FIG. 5B as a schematic of a differential power amplifier that may be used in wireless transceivers consistent with an embodiment of the present invention.

FIG. 5A is a schematic of a single-ended power amplifier (amplifier 210 of FIG. 2) that may be used in wireless transceivers consistent with an embodiment of the present invention. This circuit includes an input gain transistor 510, cascade transistor 520, and load inductor 550. A signal VIN to be transmitted is received on node 515 by gain transistor 510. Transistor 510 gains the signal and varies the current in load inductor 550 to generate an output signal VOUT on node 555. Again, the cascode transistor 520 reduces the voltage gain at the drain of 510, thereby isolating the signal VIN on node 515 from the Miller capacitance of transistor 510.

FIG. 5B is a schematic of a differential power amplifier (amplifier 210 of FIG. 2) that may be used in wireless transceivers consistent with an embodiment of the present invention. The operation of this circuit is analogous to the operation of the single-ended power amplifier circuit shown in FIG. 5A. In this example, a differential signal VINP-VINN is provided on nodes 555 and 575, and a differential output signal VOUTP-VOUTN is provided on nodes 587 and 567.

Many variations of low-noise amplifiers other than shown in FIGS. 4A and 4B may be used consistent with embodiments of the present invention. A simplified schematic of one other example is shown in FIG. 6.

Figure 6:
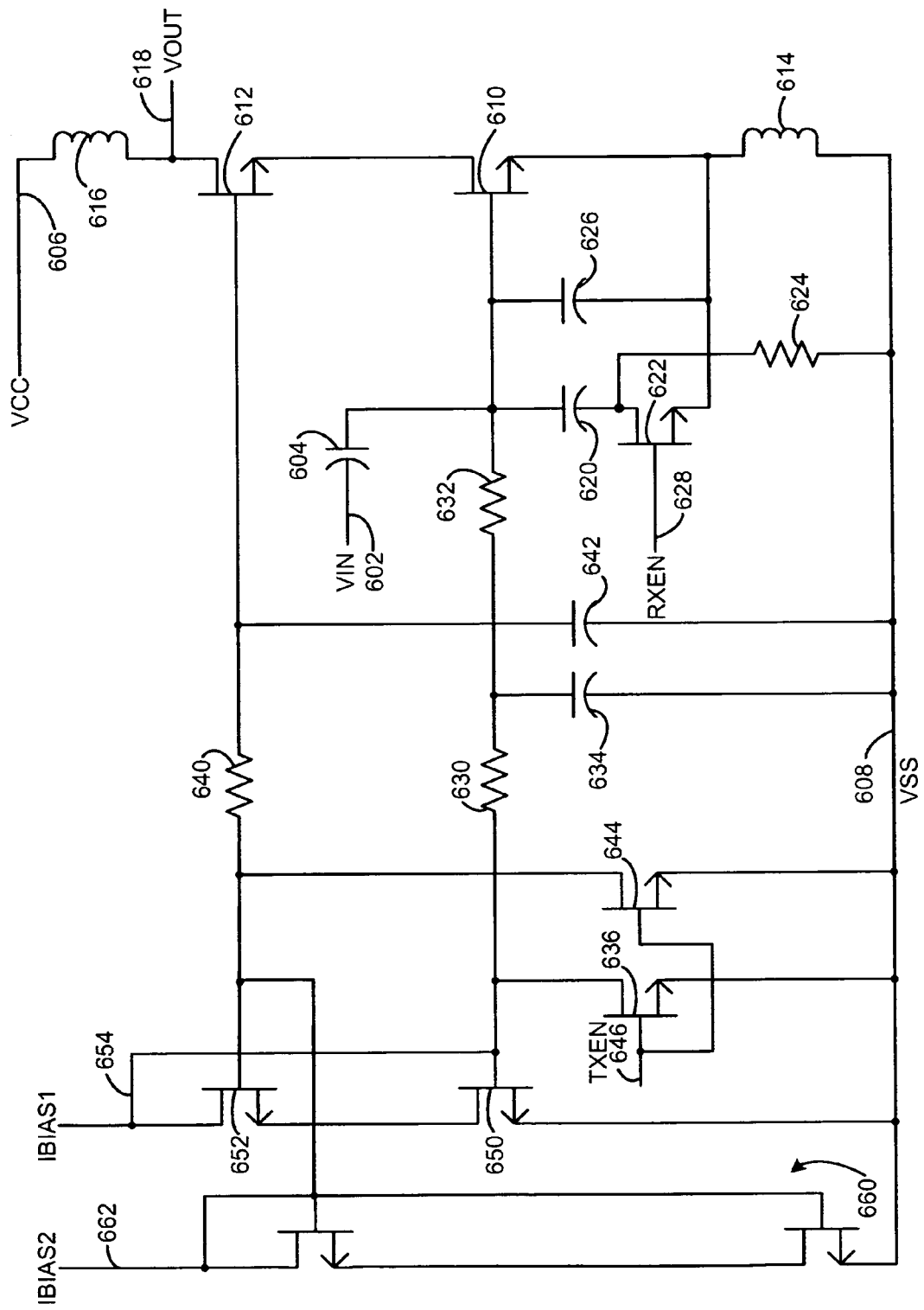
FIG. 6 is a schematic of a low-noise amplifier consistent with an embodiment of the present invention.
Figure 7:
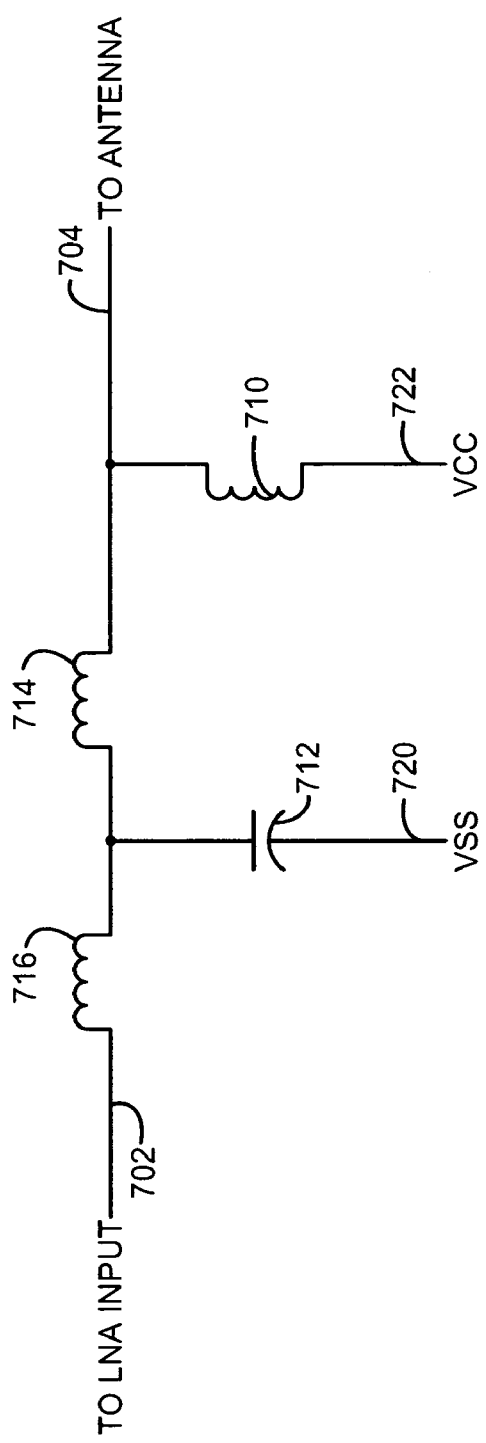
FIG. 7 illustrates an exemplary matching network for a low-noise amplifier according to an embodiment of the present invention.

FIG. 6 is a schematic of a low-noise amplifier (amplifier 250 of FIG. 2) combined with the shunt impedance circuit (270, 275, 277 of FIG. 2) and part of the matching network (240 of FIG. 2) consistent with an embodiment of the present invention. As before, an input signal is amplified by input transistor 610. Cascode transistor 612 reduces the voltage gain at the drain of transistor 610, and an output signal VOUT on node 618 is developed across load inductor 616. In this example, capacitors 626 forms a part of the matching network (matching network 240 of FIG. 2), which is shown in FIG. 7 for simplicity. Capacitor 626 may be a separate capacitor, or it may be part of the transistor 610. For example, transistor 610 may be laid out specifically to incorporate this capacitor.

Capacitor 620 is switched in and out of the matching network in order to vary the impedance of the matching network between a termination impedance and a high impedance. In this specific embodiment, when the signal RXEN on node 636 is high, transistor 622 conducts, thereby inserting capacitor 620 into the matching network such that a termination impedance is formed. When the signal RXEN on node 628 is low, transistor switch 622 is open, thereby disconnecting capacitor 620 from the matching network such that a high impedance is formed. Because the impedance formed by the on-resistance of transistor switch 622 and capacitor 620 is in parallel with capacitor 626, the overall noise contributed by the on-resistance of switch 622 can be reduced. The capacitor 620, and the other included capacitor, may be formed by multiple layers of metal separated by an insulating layer. These capacitors are referred to as MIM capacitors. Other capacitors, such as metal over silicon, or junction diode capacitances, may be used to form one or more of the included capacitors. In one embodiment, capacitor 620 is 190 pF and capacitor 626 is 390 pF.

When a high impedance is formed, resistor 624, which is a large value resistance (e.g., a 40 Kohms resistor), prevents the drain of transistor 622 from floating. In this specific example, the input signal VIN on node 602 is AC coupled to the gate of transistor 610 by a capacitor 604.

When data is being received, transistor 610 is biased by transistor 650, which in turn is biased by current source IBIAS1 on node 654. Transistor 612 is biased by transistors 660, which are in turn biased by current source IBIAS2 on node 662. Resistors 630 and 632 and capacitor 634 isolate bias transistor 650 from perturbations caused by the received signal VIN on node 602.

When data is being transmitted, it is desirable to turn off the active devices in this embodiment such that they do not conduct current. This not only saves power, but is also useful in providing a high impedance in the receive path during data transmission.

Accordingly, when transmitting, TXEN is high and transistor 636 conducts, thereby pulling the gates of transistors 650 and 610 to ground. Similarly, transistor 644 conducts, pulling the gates of transistors 612 and 652 to ground. As mentioned before, RXEN will be low when transmitting, therefore providing a high impedance looking into the receive path.

FIG. 7 illustrates an exemplary matching network [matching network 240 of FIG. 2) for a low-noise amplifier according to an embodiment of the present invention. This figure includes inductors 710, 714, and 716, and capacitor 712. In one embodiment, inductors 710, 714 and 716 are 1.9 nH, 0.6nH, 1.5nH respectively, and capacitor 712 is 500 fF to give the 50 ohms value. This network, along with the capacitances 620 and 626 in FIG. 6, provides a termination impedance that has a nominal value of 50 ohms at the carrier frequency during the receive phase. When capacitor 620 is removed, this network provides a high impedance as seen by the antenna into the low-noise amplifier.

Like the low-noise amplifier, many types of power amplifiers can be used by various embodiments of the present invention. One example is shown in the following figure.

Figure 8:
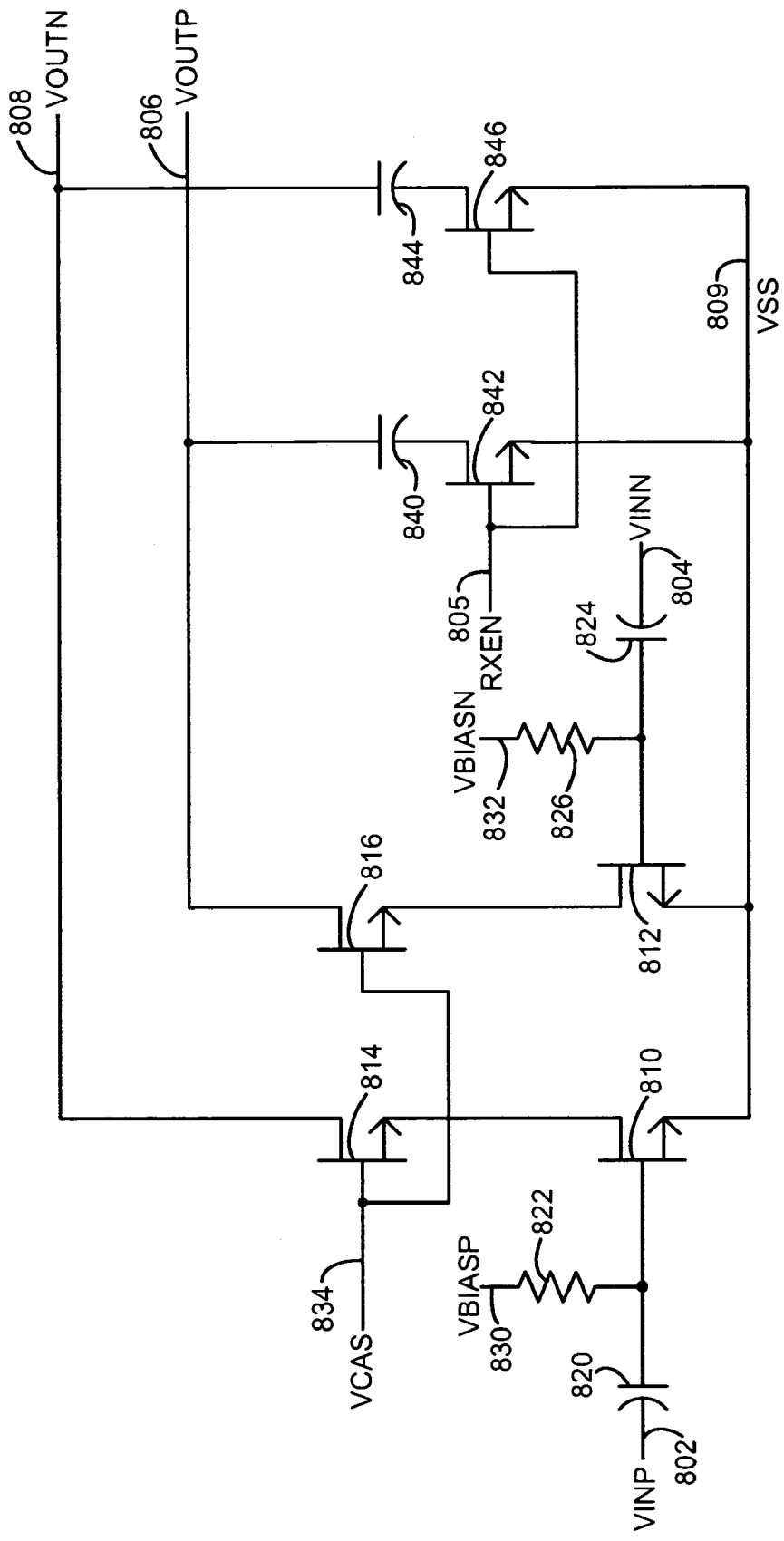
FIG. 8 illustrates a power amplifier according to an embodiment of the present invention.

FIG. 8 illustrates a power amplifier (amplifier 210 of FIG. 2) combined with the shunt impedance network (260, 265, 267 of FIG. 2) according to an embodiment of the present invention. This figure includes gain transistors 810 and 812 and cascode transistors 814 and 816. A differential signal VINP-VINN is input on nodes 802 and 804. The input signal is AC coupled to the gates of 810 and 812 via the capacitors 820 and 824. These transistors develop an output signal VOUTP-VOUTN on nodes 806 and 808. Transistors 810 and 812 are biased using resistors 822 and 826.

Capacitors 840 and 844 are inserted or disconnected from the matching network shown in the next figure by switch transistors 842 and 846. In one embodiment, the capacitors are 325 fF. Other circuitry, such as power down circuitry that grounds the gates of transistors 810, 812, 814, and 816, may be included.

Figure 9:
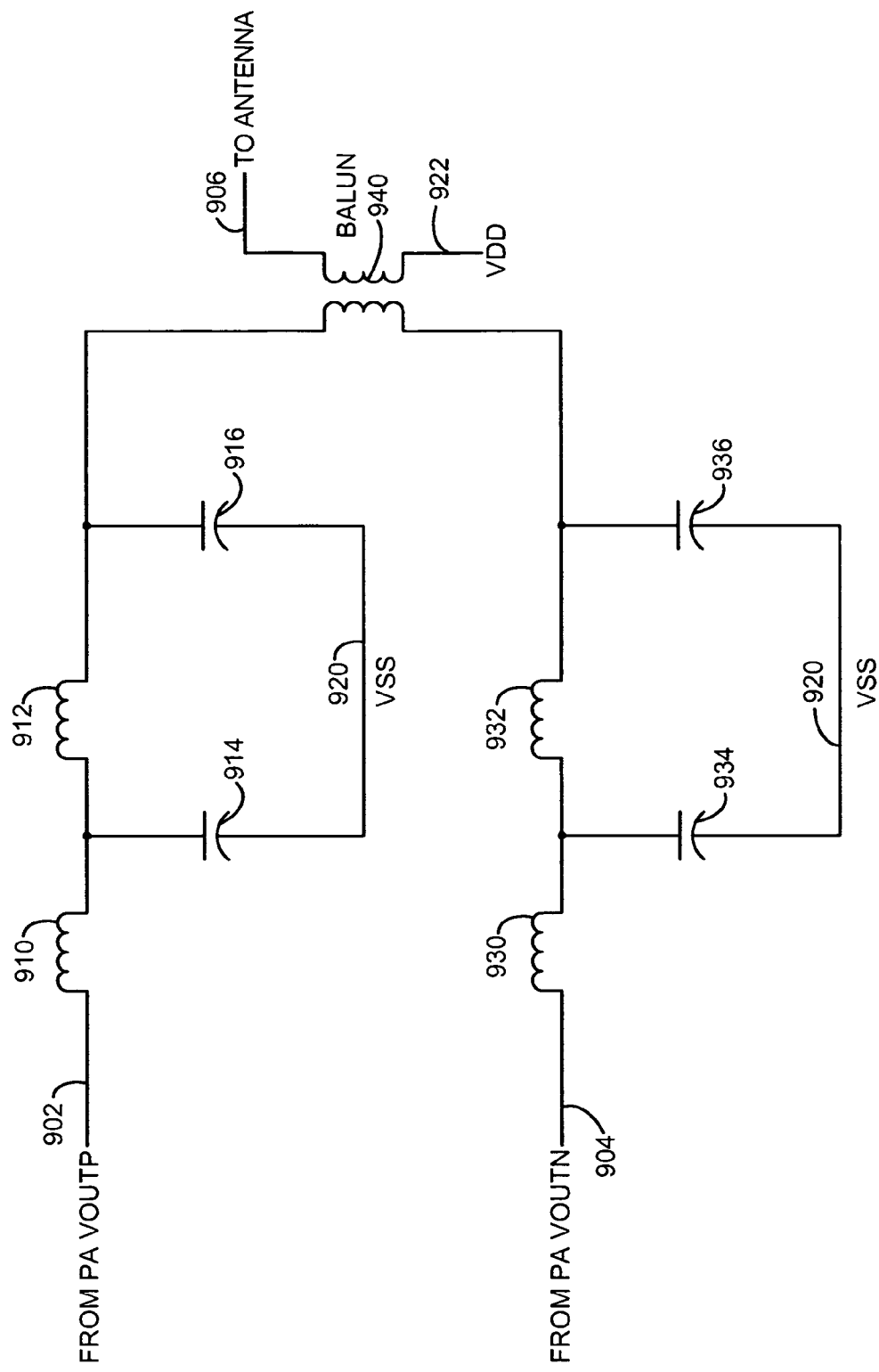
FIG. 9 illustrates a matching network for a differential power amplifier according to an embodiment of the present invention.

FIG. 9 illustrates a matching network (matching network 220 of FIG. 2) for a differential power amplifier according to an embodiment of the present invention. This figure includes inductors 910, 912, 930, and 932, as well as capacitors 914, 916, 934, and 936. In one embodiment, inductors 910 and 930 are 1.5 nH, inductors 912 and 932 are 5.2 nH, capacitors 914 and 934 are 100 W and capacitors 916 and 936 are 2 pF. A balun 940 converts the differential signal to a single-ended signal on node 906, which connects to an antenna (not shown) Other forms of matching networks which transform antenna impedance to a more optimal impedance may be used in this case.

When capacitors 840 and 844 from FIG. 8 are connected, the power amplifier sees a more optimum impedance transformed from the antenna through the matching network in FIG. 9. When capacitors 840 and 844 are disconnected, the antenna sees a high impedance looking into this network.

To provide a good power transfer, the high impedance levels only need to be high relative to the termination impedance. Accordingly, some embodiments of the present invention provide matching networks having a high impedance on the order of 300 ohms.

Figure 10:
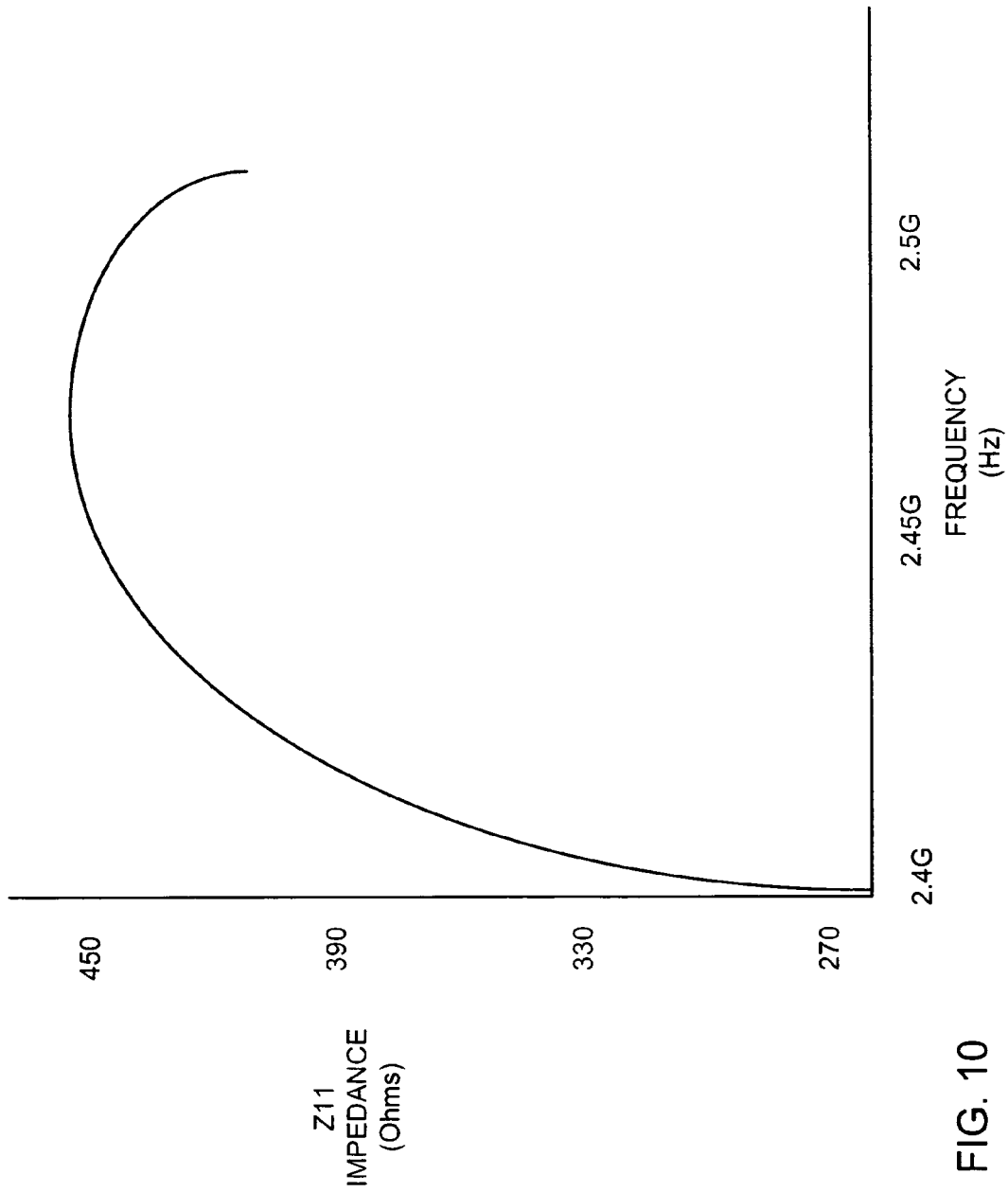
FIG. 10 is a graph illustrating the impedance as a function of frequency for a low-noise amplifier matching network according to an embodiment of the present invention.

FIG. 10 is a graph illustrating the impedance as a function of frequency for a low-noise amplifier matching network according to the embodiment of the present invention shown in FIGS. 6-9 during the transmitting phase. The Z11 impedance is graphed along the Y-axis as a function of frequency along the X-axis. The Z11 impedance varies from a peak of approximately 700 ohms to a low of 300 ohms over the frequency range of operation.

Again, what is important is that this impedance value is significant higher than 50 ohms such that most of the transmitted power is transferred from a power amplifier to antenna and not wasted in the low-noise amplifier in the receive path. The performance of the embodiments of FIGS. 6-9, providing much greater than 50 ohms, as shown in this figure, provides this specific embodiment of the present invention with a 5.4 dBm transmit power, compared to a transmit power of 6.0 dBm that can be achieved without any receive path loading.

Figure 11:
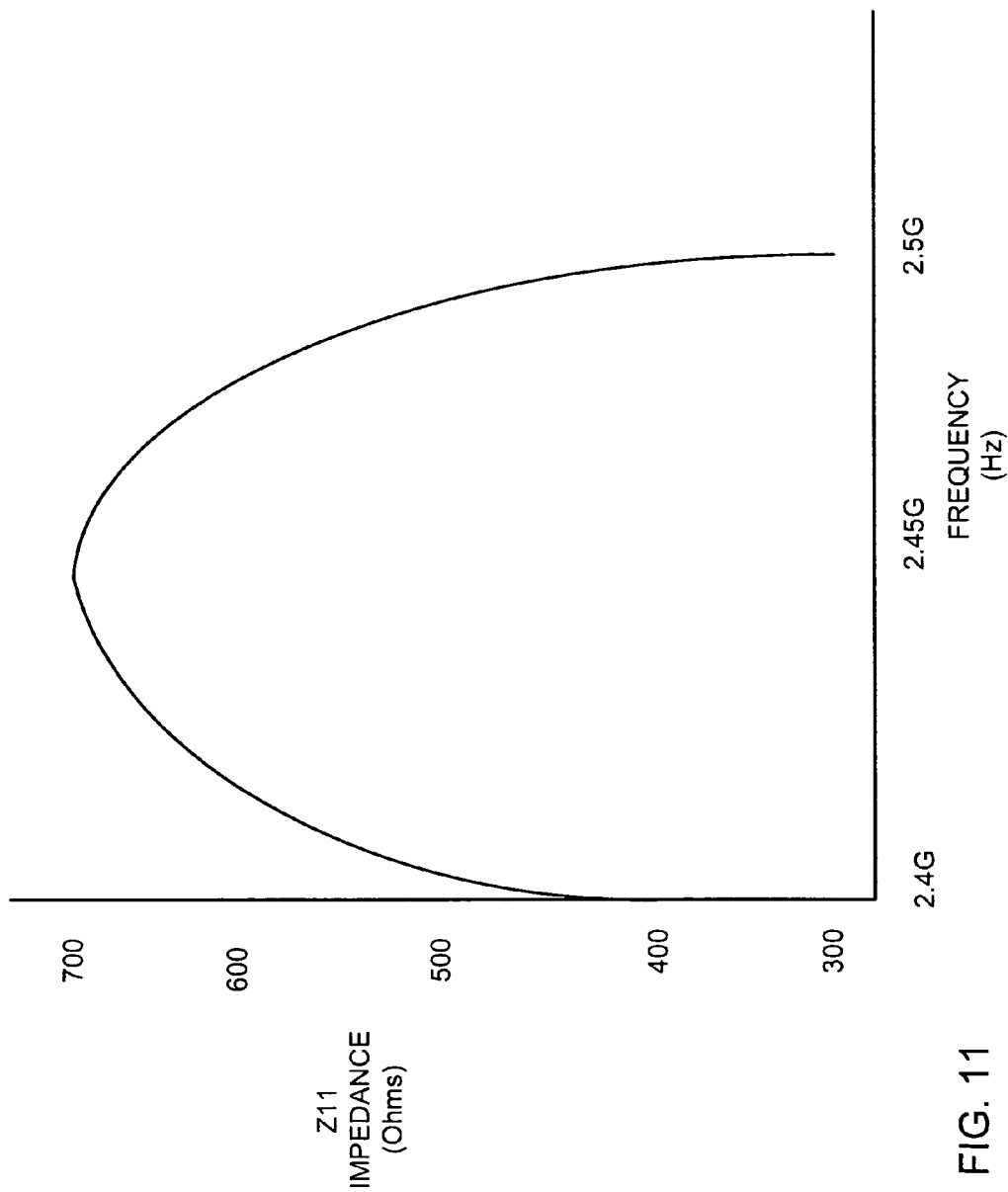
FIG. 11 is a graph illustrating the impedance as a function of frequency for a power amplifier matching network according to an embodiment of the present invention.

FIG. 11 is a graph illustrating the impedance as a function of frequency for a power amplifier matching network according to an embodiment of the present invention as shown in FIGS. 6-9 during the receiving phase. The Z11 impedance is graphed along the Y-axis as a function of frequency along the X-axis. The Z11 impedance varies from a peak of approximately 450 ohms to a low of 270 ohms over the frequency range of operation.

Again, what is important is that this value is significant higher than 50 ohms such that most of the received power is transferred to a low-noise amplifier from an antenna and not wasted in the power amplifier in the transmit path. The performance of the embodiments of FIGS. 6-9, as shown in this figure provides, this specific embodiment of the present invention with a noise figure of 2.16 dB, compared to a noise figure of 1.62 dB that can be achieved without any transmit path loading. Further, the voltage gain of 23 dB for the low-noise amplifier is not changed due to this transmit path loading.

The embodiments of the invention can be applied in a number of ways. For example, an integrated circuit may operate at multiple frequencies, and or for multiple protocols (Bluetooth, broadband, etc.). Separate transmitters with separate shunts can used for each, or one shunt could be used for multiple transmission circuits. The frequency (and thus needed shunt impedance) can be determined when the circuit is manufactured, or at a later calibration, or during operation of the circuit. In one possible embodiment, if frequency hopping is used, the impedance can be varied for each hop. In another example, the impedance is varied when selecting between Bluetooth, broadband or other frequencies or protocols. In another example, the impedance can be varied after a handshake where an agreed frequency is determined.

Figures 12A, 12B:
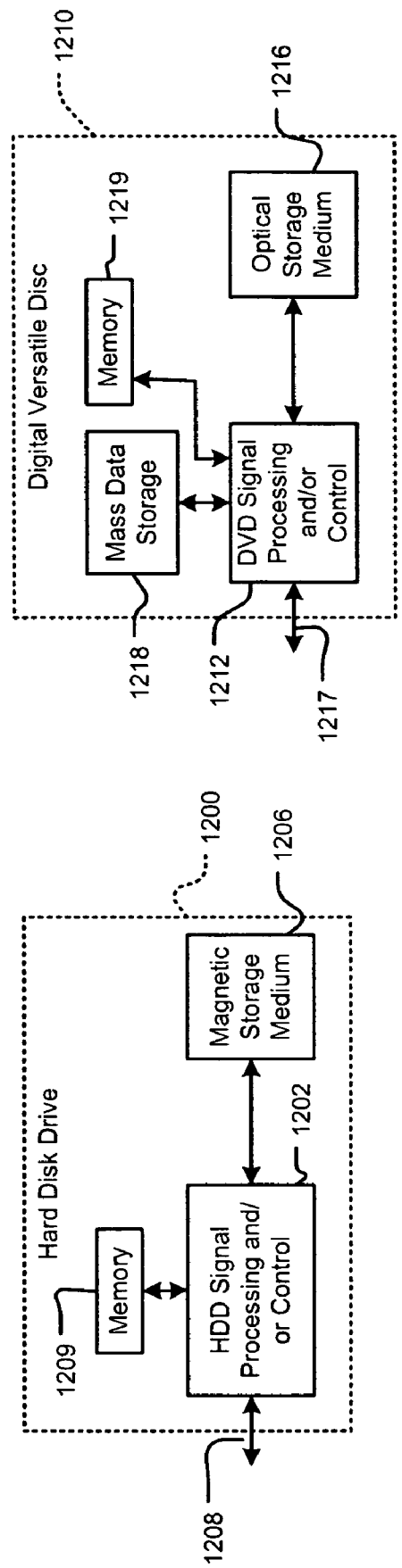

Referring now to FIGS. 12A-12G, various exemplary implementations of the present invention are shown. Referring to FIG. 12A, the present invention may be embodied in a hard disk drive 1200. The present invention may be implemented in wireless communication links included in links 1208.

HDD 1200 may communicate with a host device (not shown) such as a computer, mobile computing devices such as personal digital assistants, cellular phones, media or MP3 players and the like, and/or other devices via one or more wired or wireless communication links 1208. HDD 1200 may be connected to memory 1209, such as random access memory (RAM), a low latency nonvolatile memory such as flash memory, read only memory (ROM) and/or other suitable electronic data storage. The signal processing and/or control circuit 1202 and/or other circuits (not shown) in HDD 1200 may process data, perform coding and/or encryption, perform calculations, and/or format data that is output to and/or received from a magnetic storage medium 1206.

Referring now to FIG. 12B, the present invention may be embodied in a digital versatile disc (DVD) drive 1210. Specifically, the present invention may implement via one or more wireless communication links included in links 1217. DVD drive 1210 may communicate with an output device (not shown) such as a computer, television or other device via one or more wired or wireless communication links 1217.

DVD 1210 may communicate with mass data storage 1218 that stores data in a nonvolatile manner. Mass data storage 1218 may include a hard disk drive (HDD) such as that shown in FIG. 12A. The HDD may be a mini HDD that includes one or more platters having a diameter that is smaller than approximately 1.8." DVD 1210 may be connected to memory 1219, such as RAM, ROM, low latency nonvolatile memory such as flash memory, and/or other suitable electronic data storage. Signal processing and/or control circuit 1212 and/or other circuits (not shown) in DVD 1210 may process data, perform coding and/or encryption, perform calculations, and/or format data that is read from and/or data written to an optical storage medium 1216. In some implementations, signal processing and/or control circuit 1212 and/or other circuits (not shown) in DVD 1210 can also perform other functions such as encoding and/or decoding and/or any other signal processing functions associated with a DVD drive.

Referring now to FIG. 12C, the present invention may be embodied in a high definition television (HDTV) 1220. The present invention may implement a WLAN interface for the HDTV 1220. HDTV 1220 receives HDTV input signals in either a wired or wireless format and generates HDTV output signals for a display 1226. In some implementations, signal processing circuit and/or control circuit 1222 and/or other circuits (not shown) of HDTV 1220 may process data, perform coding and/or encryption, perform calculations, format data and/or perform any other type of HDTV processing that may be required.

HDTV 1220 may communicate with mass data storage 1227 that stores data in a nonvolatile manner such as optical and/or magnetic storage devices. At least one HDD may have the configuration shown in FIG. 12A and/or at least one DVD may have the configuration shown in FIG. 12B. The HDD may be a mini HDD that includes one or more platters having a diameter that is smaller than approximately 1.8." HDTV 1220 may be connected to memory 1228 such as RAM, ROM, low latency nonvolatile memory such as flash memory and/or other suitable electronic data storage.

Referring now to FIG. 12D, the present invention implements a WLAN interface for the vehicle control system. In some implementations, the present invention provides communicate to a powertrain control system 1232 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

Control system 1240 may likewise receive signals from input sensors 1242 and/or output control signals to one or more output devices 1244. In some implementations, control system 1240 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1232 may communicate with mass data storage 1246 that stores data in a nonvolatile manner. Mass data storage 1246 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8." Powertrain control system 1232 may be connected to memory 1247 such as RAM, ROM, low latency nonvolatile memory such as flash memory and/or other suitable electronic data storage. Powertrain control system 1232 also may support connections with a WLAN via a WLAN network interface 1248.

Figure 12E:
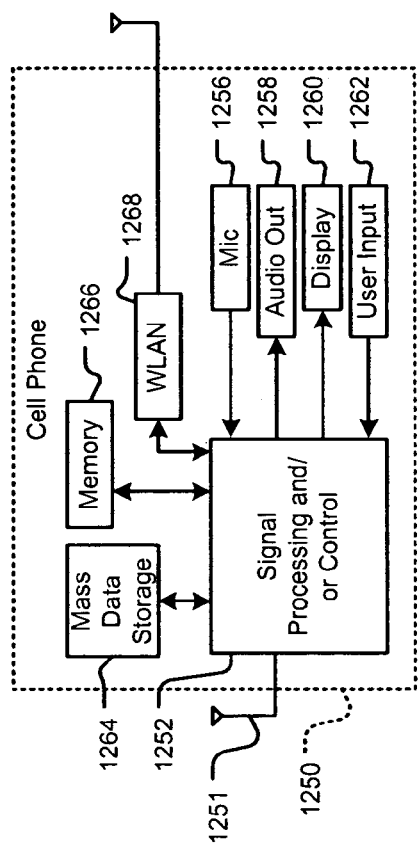

Referring now to FIG. 12E, the present invention may be embodied in a cellular phone 1250 that may include a cellular antenna 1251. The present invention may implement a WLAN interface for the cellular phone 1250. In some implementations, cellular phone 1250 includes a microphone 1256, an audio output 1258 such as a speaker and/or audio output jack, a display 1260 and/or an input device 1262 such as a keypad, pointing device, voice actuation and/or other input device. Signal processing and/or control circuits 1252 and/or other circuits (not shown) in cellular phone 1250 may process data, perform coding and/or encryption, perform calculations, format data and/or perform other cellular phone functions.

Cellular phone 1250 may communicate with mass data storage 1264 that stores data in a nonvolatile manner such as optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8." Cellular phone 1250 may be connected to memory 1266 such as RAM, ROM, low latency nonvolatile memory such as flash memory and/or other suitable electronic data storage. Cellular phone 1250 also may support connections with a WLAN via a WLAN network interface 1268.

Figure 12F:
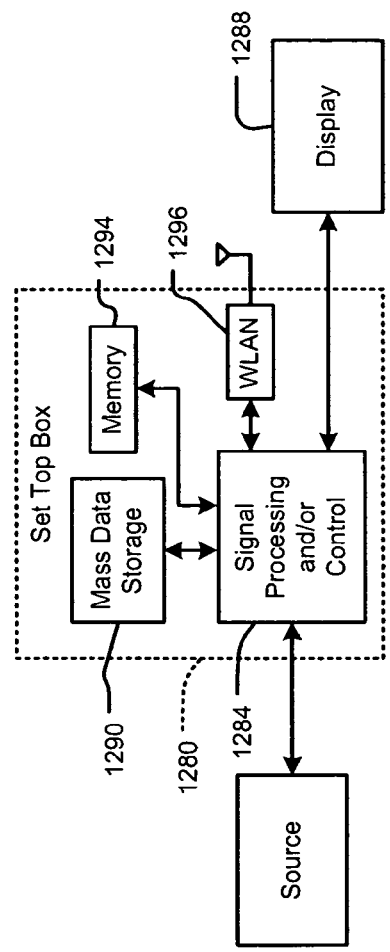

Referring now to FIG. 12F, the present invention may be embodied in a set top box 1280. The present invention may implement a WLAN interface for the set top box 1280. Set top box 1280 receives signals from a source such as a broadband source and outputs standard and/or high definition audio/video signals suitable for a display 1288 such as a television and/or monitor and/or other video and/or audio output devices. Signal processing and/or control circuits 1284 and/or other circuits (not shown) of the set top box 1280 may process data, perform coding and/or encryption, perform calculations, format data and/or perform any other set top box function.

Set top box 1280 may communicate with mass data storage 1290 that stores data in a nonvolatile manner. Mass data storage 1290 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8." Set top box 1280 may be connected to memory 1294 such as RAM, ROM, low latency nonvolatile memory such as flash memory and/or other suitable electronic data storage. Set top box 1280 also may support connections with a WLAN via a WLAN network interface 1296.

Figure 12G:
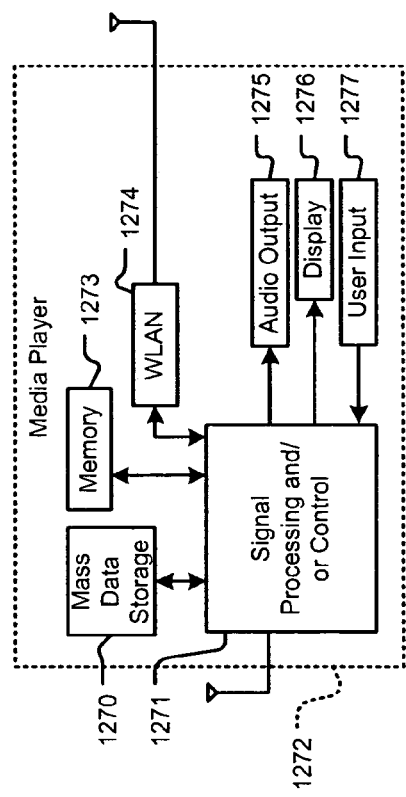

Referring now to FIG. 12G, the present invention may be embodied in a media player 1272. The present invention may implement a WLAN interface for the media player 1272. In some implementations, media player 1272 includes a display 1276 and/or a user input 1277 such as a keypad, touchpad and the like. In some implementations, media player 1272 may employ a graphical user interface (GUI) that typically employs menus, drop down menus, icons and/or a point-and-click interface via display 1276 and/or user input 1277. Media player 1272 further includes an audio output 1275 such as a speaker and/or audio output jack. Signal processing and/or control circuits 1271 and/or other circuits (not shown) of media player 1272 may process data, perform coding and/or encryption, perform calculations, format data and/or perform any other media player function.

Media player 1272 may communicate with mass data storage 1270 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8." Media player 1272 may be connected to memory 1273 such as RAM, ROM, low latency nonvolatile memory such as flash memory and/or other suitable electronic data storage. Media player 1272 also may support connections with a WLAN via a WLAN network interface 1274.

Figure 12H:
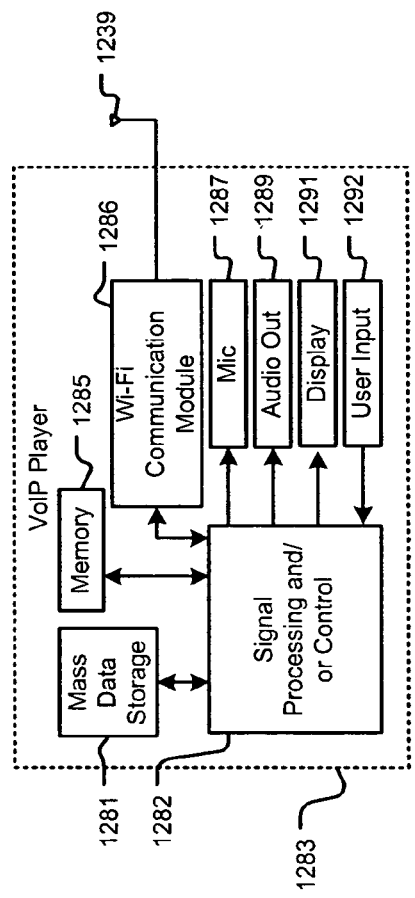

Referring to FIG. 12H, the present invention may be embodied in a Voice over Internet Protocol (VoIP) phone 1283 that may include an antenna 1239. The present invention may implement a wireless interface for the VoIP phone 1283. In some implementations, VoIP phone 1283 includes, in part, a microphone 1287, an audio output 1289 such as a speaker and/or audio output jack, a display monitor 1291, an input device 1292 such as a keypad, pointing device, voice actuation and/or other input devices, and a Wireless Fidelity (Wi-Fi) communication module 1286. Signal processing and/or control circuits 1282 and/or other circuits (not shown) in VoIP phone 1283 may process data, perform coding and/or encryption, perform calculations, format data and/or perform other VoIP phone functions.

VoIP phone 1283 may communicate with mass data storage 502 that stores data in a nonvolatile manner such as optical and/or magnetic storage devices, for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8." VoIP phone 1283 may be connected to memory 1285, which may be a RAM, ROM, low latency nonvolatile memory such as flash memory and/or other suitable electronic data storage. VoIP phone 1283 is configured to establish communications link with a VoIP network (not shown) via Wi-Fi communication module 1286. Still other implementations in addition to those described above are contemplated.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of isolating a transmitting circuit and a receiving circuit in a wireless transceiver, the method comprising:
   when in a data reception mode:
   changing an input impedance of the receiving circuit from a high impedance to a termination impedance with a first switch in series with a first component, the first component and the first switch shunting an input signal path; and
   changing an output impedance of the transmitting circuit from a termination impedance to a high impedance with a second switch in series with a second component, the second component and the second switch shunting an output signal path; and
   when in a data transmission mode:
   changing the input impedance of the receiving circuit from the termination impedance to the high impedance with the first switch; and
   changing the output impedance of the transmitting circuit from the high impedance to the termination impedance with the second switch.

2. The method of claim 1 further comprising integrating the first switch and the second switch as N-channel MOS transistors on an integrated circuit, and further integrating the transmitting circuit and the receiving circuit on the integrated circuit.

3. The method of claim 1 wherein at least one of the first component and the second component are capacitors.

4. The method of claim 1 further comprising, when the first switch is closed, inserting the first component in parallel with a gate-to-source capacitance of an input transistor of a low-noise amplifier.

5. The method of claim 1 further comprising, when the second switch is closed, inserting the second component between a drain of an output transistor of a power amplifier and a first supply terminal.

6. The method of claim 1 further comprising, when the first switch is closed, inserting the first component in parallel with a first matching network, and
when the second switch is closed, inserting the second component in parallel with a second matching network.

7. The method of claim 1, wherein when the first switch is not shunting the input signal path, the first switch is not in the input signal path; and
wherein when the second switch is not shunting the output signal path, the second switch is not in the output signal path.

8. The method of claim 1, wherein the input signal path comprises an antenna, a first matching network and a first amplifier;
wherein at least one of the first component and the first switch is connected to the input signal path only via a single first node;
wherein the output signal path comprises the antenna, a second matching network and a second amplifier; and
wherein at least one of the second component and the second switch is connected to the output signal path only via a single second node.

9. A method of receiving and transmitting data using a wireless transceiver, the method comprising:
for a data reception mode:
closing a first switch, the first switch in series with a first capacitor, such that the first capacitor is inserted in parallel with a gate-to-source capacitance of an input gain transistor of a low-noise amplifier; and
closing a second switch and a third switch, the second switch in series with a second capacitor and the third switch in series with a third capacitor, such that the second capacitor is inserted between a drain of a first output transistor of a power amplifier and a first supply terminal and the third capacitor is inserted between a drain of a second output transistor of the power amplifier and the first supply terminal; and
for a data transmission mode:
opening the first switch such that the first capacitor is not in parallel with the gate-to-source capacitance of the input gain transistor of the low-noise amplifier; and
opening the second switch and the third switch such that the second capacitor is not between the drain of the first output transistor of the power amplifier and the first supply terminal and the third capacitor is not between the drain of the second output transistor of the power amplifier and the first supply terminal.

10. The method of claim 9 further comprising integrating the first, second, and third switches as N-channel MOS transistors on an integrated circuit, and further integrating the low-noise amplifier and power amplifier on the integrated circuit.

11. The method of claim 9 wherein the first, second, and third capacitors are metal-insulator-metal capacitors.

12. The method of claim 9 further comprising putting a drain of the input gain transistor of the low-noise amplifier in communication with a source of a cascode transistor and a source of the input gain transistor in communication with an inductor.

13. The method of claim 9 wherein the first output transistor is a first cascode transistor having a source in communication with a drain of a first input transistor of the power amplifier, and the second output transistor is a second cascode transistor having a source in communication with a drain of a second input transistor of the power amplifier.

14. The method of claim 9 further comprising, when the first switch is closed, putting the first capacitor in parallel with a first matching network.

15. The method of claim 9 further comprising, when the second and third switches are closed, putting the second capacitor in parallel with a first portion of a second matching network and the third capacitor in parallel with a second portion of a second matching network.

16. A wireless transceiver comprising:
an input path including an input matching network;
a first switch in series with a first component, the first component and the first switch shunting the input signal path to change an input impedance;
an output path including an output matching network; and
a second switch in series with a second component, the second component and the second switch shunting the output path.

17. The wireless transceiver of claim 16 wherein the first switch and the second switch are N-channel MOS transistors on an integrated circuit, the integrated circuit further comprising a transmitting circuit and a receiving circuit.

18. The wireless transceiver of claim 16 wherein at least one of the first component or the second component are capacitors.

19. The wireless transceiver of claim 16 wherein when the first switch is closed, the first component is inserted in parallel with a gate-to-source capacitance of an input transistor of a low-noise amplifier.

20. The wireless transceiver of claim 19 wherein a drain of the input transistor of the low-noise amplifier is in communication with a source of a cascode transistor and a source of the input transistor of the low-noise amplifier is in communication with an inductor.

21. The wireless transceiver of claim 16 wherein when the second switch is closed, the second component is inserted between a drain of an output transistor of a power amplifier and a first supply terminal.

22. The wireless transceiver of claim 21 wherein the output transistor is a cascode transistor having a source in communication with a drain of an input transistor of the power amplifier.

23. The wireless transceiver of claim 16 wherein when the first switch is closed, the first component is in parallel with the input matching network, and
wherein when the second switch is closed, the second component is in parallel with the output matching network.

24. The method of claim 16, wherein when the first switch is not shunting the input signal path, the first switch is not in the input signal path; and
wherein when the second switch is not shunting the output signal path, the second switch is not in the output signal path.

25. The method of claim 16, wherein the input signal path comprises an antenna, a first amplifier, and the input matching network;
- wherein at least one of the first component and the first switch is connected to the input signal path only via a single first node;
- wherein the output signal path comprises the antenna, a second amplifier network, and the output matching network; and
- wherein at least one of the second component and the second switch is connected to the output signal path only via a single second node.

26. A wireless transceiver comprising:
- a first switch in series with a first capacitor;
- a low-noise amplifier including an input gain transistor, where the first switch in series with the first capacitor is in parallel with a gate-to-source capacitance of the input gain transistor;
- a second switch in series with a second capacitor;
- a third switch in series with a third capacitor;
- a power amplifier comprising a first output transistor and a second output transistor, where the second switch in series with the second capacitor is between a drain of the first output transistor and a first supply voltage, and the third switch in series with the third capacitor is between a drain of the second output transistor and the first supply voltage.

27. The wireless transceiver of claim 26 wherein the first, second, and third switches are N-channel MOS transistors on an integrated circuit, the integrated circuit further comprising the low-noise amplifier and power amplifier.

28. The wireless transceiver of claim 26 wherein the first, second, and third capacitors are metal-insulator-metal capacitors.

29. The wireless transceiver of claim 26 wherein a drain of the input gain transistor of the low-noise amplifier is in communication with a source of a cascode transistor and a source of the input gain transistor is in communication with an inductor.

30. The wireless transceiver of claim 26 wherein the first output transistor of the power amplifier is a first cascode transistor having a source in communication with a drain of a first input transistor of the power amplifier, and the second output transistor of the power amplifier is a second cascode transistor having a source in communication with a drain of a second input transistor of the power amplifier.

31. The wireless transceiver of claim 26 wherein when the first switch is closed, the first capacitor is in parallel with a first matching network.

32. The wireless transceiver of claim 31 wherein when the second and third switches are closed, the second capacitor is in parallel with a first portion of a second matching network and the third capacitor is in parallel with a second portion of the second matching network.

33. An apparatus for isolating a transmitting circuit and a receiving circuit in a wireless transceiver, comprising:
- means, responsive to a data reception mode, for:
  - changing an input impedance of the receiving circuit from a high impedance to a termination impedance using a first shunting component in an input signal path; and
  - changing an output impedance of the transmitting circuit from a termination impedance to a high impedance using a second shunting component in an output signal path; and
- means, responsive to a data transmission mode, for:
  - changing the input impedance of the receiving circuit from the termination impedance to the high impedance with the first shunting component; and
  - changing the output impedance of the transmitting circuit from the high impedance to the termination impedance with the second shunting component.

34. The apparatus of claim 33 wherein the first and second shunting components comprise a first switch and a second switch which are integrated as N-channel MOS transistors on an integrated circuit, along with the transmitting circuit and the receiving circuit.

35. The apparatus of claim 33 wherein at least one of the first shunting component or the second shunting component include a capacitor.

36. The apparatus of claim 33 further comprising:
- a low noise amplifier having an input transistor; and
- means for inserting the first shunting component in parallel with a gate-to-source capacitance of the input transistor of the low-noise amplifier.

37. The apparatus of claim 33 further comprising:
- a power amplifier having an output transistor;
- a first supply terminal; and
- means for inserting the second shunting component between a drain of the output transistor of the power amplifier and the first supply terminal.

38. The apparatus of claim 33 further comprising:
- a first matching circuit;
- means for inserting the first shunting component in parallel with the first matching circuit;
- a second matching circuit; and
- means for inserting the second shunting component in parallel with the second matching circuit.

39. The method of claim 33, wherein when the first shunting component is not being used to change the input impedance of the receiving circuit from the high impedance to the termination impedance, the first shunting component is not in the input signal path; and
- wherein when the second shunting component is not being used to change the output impedance of the transmitting circuit from the termination impedance to the high impedance, the second shunting component is not in the output signal path.

40. The method of claim 33, wherein the input signal path comprises an antenna, a first matching network, and a first amplifier;
- wherein the first shunting component is connected to the input signal path only via a single first node;
- wherein the output signal path comprises the antenna, a second matching network, and a second amplifier; and
- wherein the second shunting component is connected to the output signal path only via a single second node.

* * * * *